United States Patent
Yagi

Patent Number: 6,002,188
Date of Patent: Dec. 14, 1999

[54] MOTOR BEARING ARRANGEMENT AND ELECTRIC MOTOR USING THE SAME

[75] Inventor: Toshiharu Yagi, Saitama, Japan

[73] Assignees: Sanyo Electric Co., Ltd., Osaka; Kumagaya Seimitsu Co., Ltd., Saitama, both of Japan

[21] Appl. No.: 09/078,547

[22] Filed: May 14, 1998

[30] Foreign Application Priority Data

May 15, 1997 [JP] Japan ................................. 9-139140

[51] Int. Cl.$^6$ ................................................ H02K 5/16
[52] U.S. Cl. ........................ 310/90; 310/68 R; 310/268; 310/67 R
[58] Field of Search ....................... 310/90, 90.5

[56] References Cited

U.S. PATENT DOCUMENTS

| | | | |
|---|---|---|---|
| 4,820,949 | 4/1989 | Mizobuchi et al. | 310/90 |
| 5,252,871 | 10/1993 | Inoue | 310/90 |
| 5,861,687 | 1/1999 | Iwanaga et al. | 310/90 |

FOREIGN PATENT DOCUMENTS

| | | | |
|---|---|---|---|
| 2-280645A | 11/1990 | Japan | 310/90 |
| 4-355640A | 12/1992 | Japan | 310/90 |
| 6-26517 | 2/1994 | Japan | 310/90 |
| 6-261490 | 9/1994 | Japan | 310/90 |

*Primary Examiner*—Elvin Enad
*Attorney, Agent, or Firm*—Armstrong, Westerman, Hattori, McLeland & Naughton

[57] ABSTRACT

In a bearing arrangement including a thrust bearing and a radial bearing, the thrust bearing includes a first thrust plate which is fixedly secured to a stator plate, and the radial bearing is integrally attached to the first thrust plate of the thrust bearing. Because the radial bearing is directly attached to the first thrust plate of the thrust bearing, the perpendicularity of the radial bearing with respect to the thrust support surface can be easily ensured. Also, the first thrust plate normally consists of a highly rigid member, and this also contributes in the favorable perpendicularity of the radial bearing with respect to the thrust support surface. This bearing arrangement is useful in a spindle motor for turning a floppy disk in a floppy disk drive.

2 Claims, 3 Drawing Sheets

MOTOR BEARING ARRANGEMENT AND ELECTRIC MOTOR USING THE SAME

TECHNICAL FIELD

The present invention relates to a motor bearing arrangement, and in particular to a bearing arrangement which is suitable for rotatively driving a floppy disk in a floppy disk drive. The present invention also relates to an electric motor including such a bearing arrangement.

BACKGROUND OF THE INVENTION

Conventionally, a spindle motor as illustrated in FIG. 7 was typically used as an electric motor for rotating a 3.5-inch floppy disk in a floppy disk drive. In the illustrated spindle motor, a tubular radial bearing 3 made of oil-less metal is fixedly and directly secured, for instance by crimping, to a stator plate 1 made of ferromagnetic material and carrying an electric circuit thereon. A thrust ball bearing 5 is attached to the upper surface of the stator plate 1 so as to concentrically surround the radial bearing 3. The thrust ball bearing 5 comprises a retainer 5b rotatably carrying a plurality of steel balls 5a, and a pair of annular thrust plates 5c and 5d interposing the retainer assembly therebetween. The lower thrust plate 5c is secured to the stator plate 1 by a bonding agent or the like. A plurality of drive coils 7 are mounted on the upper surface of the stator plate 1 so as to concentrically surround the thrust ball bearing 5. A rotor shaft 11 fixedly attached to a rotor plate 9 is rotatably supported by the radial bearing 3, and the rotor plate 9 abuts the upper surface of the thrust plate 5d. An annular drive magnet 13 is secured to the rotor plate 9 so as to oppose the drive coils 7.

In this spindle motor, the rotor shaft 11 is supported by the radial bearing 3 with respect to the radial direction, and the rotor plate 9 is supported by the thrust ball bearing 5 with respect to the axial direction while the rotor plate 9 rotates around the pivot shaft 11. A floppy disk mounted on the back (upper) side of the rotor plate 9 by known retaining means not shown in the drawing can be rotatively driven as required.

However, according to this conventional spindle motor, because the radial bearing 3 supporting the rotor shaft 11 is directly attached to the stator plate 1 by crimping, the pressure applied to the stator plate 1 for crimping tends to produce deformation in the stator plate 1 so that the rotor shaft 11 may tilt or may be otherwise improperly installed, and this can seriously damage the commercial value of the motor. For instance, the rotor plate 9 may undergo a whirling movement, or the floppy disk may not turn in a prescribed plane.

Also, when the stator plate 1 made of ferromagnetic material is subjected to the magnetic attractive force of the drive magnet 13 attached to the rotor plate 9, the stator plate 1 may tilt around the thrust ball bearing 5, and a significant deflection may be produced in the part of the stator plate 1 adjacent to the radial bearing 3. This can lead to a significant tilting of the rotor shaft 11, and the floppy disk may not be turned in a prescribed plane as desired. In FIG. 8, the letter S indicates the displacement of the stator plate 1 that may be produced in a part near the radial bearing 3 in this manner.

Also, because the radial bearing 3 and the thrust ball bearing 5 are separately formed, and respectively attached to the stator plate 1, the dimensional and positional errors of these two parts may add up, and it is therefore highly difficult to ensure the perpendicularity of the rotor shaft 11 with respect to the thrust support surface (double dot chain line A in FIG. 9).

BRIEF SUMMARY OF THE INVENTION

In view of such problems of the prior art, a primary object of the present invention is to provide an improved bearing arrangement for an electric motor having a rotor member including a rotor shaft and a stator plate opposing each other and provided with means for supporting the rotor member on the stator plate with respect to both axial and radial directions which can easily ensure the perpendicularity of the rotor shaft with respect to the reference plane of the stator plate.

A second object of the present invention is to provide such a bearing arrangement which is both simple and economical at the same time.

A third object of the present invention is to provide such a bearing arrangement which easy to assemble.

A fourth object of the present invention is to provide an electric motor incorporated with such a bearing arrangement.

These and other objects of the present invention can be accomplished by providing a bearing arrangement for an electric motor, comprising: a thrust bearing interposed between a rotor member and a stator plate of an electric motor for supporting a thrust force acting between the rotor member and the stator plate; a radial bearing fixedly secured to the stator plate for rotatably supporting a rotor shaft which is fixedly secured to the rotor member; wherein the thrust bearing includes a first thrust plate which is fixedly secured to the stator plate, and the radial bearing is integrally attached to the stator plate via the first thrust plate.

Thus, because the radial bearing is directly attached to the first thrust plate of the thrust bearing, the perpendicularity of the radial bearing with respect to the thrust support surface can be easily ensured. Also, the first thrust plate normally consists of a highly rigid member, and this also contributes in the favorable perpendicularity of the radial bearing with respect to the thrust support surface.

According to a preferred embodiment of the present invention, the first thrust plate includes a support boss which extends integrally therefrom in an axial direction, and the radial bearing is closely fitted into the support boss. This embodiment allows the manufacturing cost and the assembly work to be minimized.

Typically, the thrust bearing further comprises a second thrust plate which is attached to the rotor member, and a plurality of rolling elements such as steel balls interposed between the two thrust plates. As an economical and simple sealing arrangement for this bearing arrangement, outer peripheral parts of the thrust plates may be overlapping each other so that the rolling elements are received in a substantially closed space defined by the thrust plates and the support boss. The first thrust plate is normally attached to the radial bearing by crimping a part of the radial bearing onto the first thrust plate, or welding a part of the radial bearing onto the first thrust plate, among other possibilities.

This bearing arrangement can be readily incorporated in an electric motor for driving a floppy disk in a floppy disk drive. The electric motor then may comprise a stator assembly including a stator plate and drive coils mounted thereon; a rotor assembly including a rotor member, a rotor shaft securely attached to the rotor member, and a drive coils opposing the drive magnet; a thrust bearing interposed between the rotor member and the stator plate for supporting a thrust force acting between the rotor member and the stator plate; and a radial bearing fixedly secured to the stator plate for rotatably supporting a rotor shaft which is fixedly secured to the rotor member; wherein the thrust bearing includes a first thrust plate which is fixedly secured to the stator plate, and the radial bearing is integrally attached to the stator plate via the first thrust plate.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
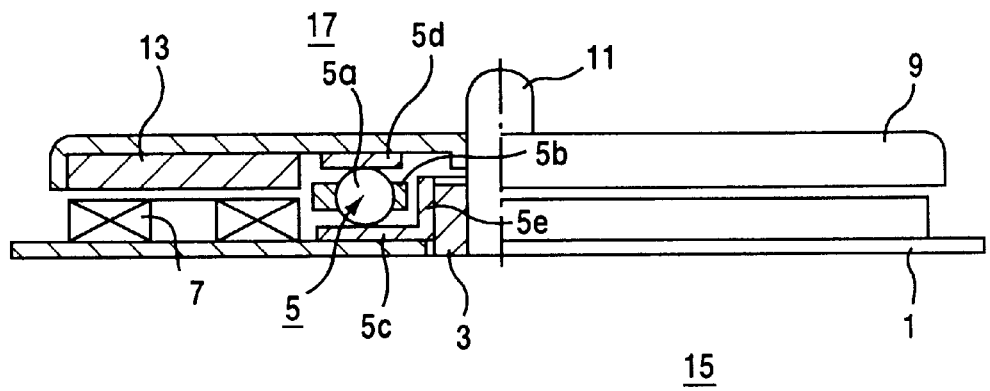
FIG. 1 is a sectional view of a spindle motor incorporated with a bearing arrangement embodying the present invention.

A bearing device embodying the present invention is illustrated in FIG. 1 along with an associated spindle motor. The spindle motor comprises a stator plate 1 which is stamp formed from ferromagnetic sheet metal such as steel plate, and a thrust ball bearing 5 fixedly secured to the stator plate 1. The stator plate 1 is in turn fixedly secured to a frame structure not shown in the drawing, and carries thereon an electric circuit which is also not shown in the drawing.

The thrust ball bearing 5 comprises a retainer 5b made of an annular plate, a plurality of steel balls 5a rotatably retained in the retainer 5b in the known manner, a pair of annular thrust plates 5c and 5d which interpose the steel balls 5a therebetween in a rolling contact. The thrust plates 5c and 5d are typically made of harder material than the stator plate 1 to ensure a favorable rolling movement of the steel balls 5a.

One of the thrust plates (lower thrust plate in the drawing) 5c is integrally provided with a support boss 5e which projects toward the other thrust plate 5d defining a 90 degree angle with respect to the stator plate 1. The support boss 5e can be formed, for instance, by stamp forming, as an axial extension of the lower thrust plate 5c. The support boss 5e is disposed in such a manner that its central axial line coincides with a central axial line of a circle along which the steel balls 5a are arranged, and the outer surface of the support boss 5e opposes the inner circumferential surface of the retainer 5b defining a small gap therebetween.

Figure 2:
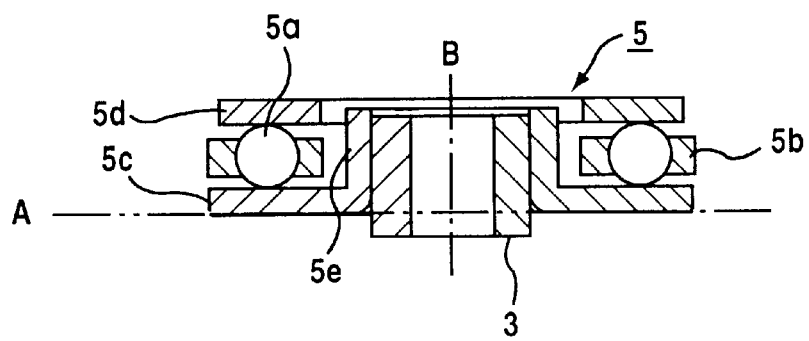
FIG. 2 is an enlarged view of the bearing arrangement of FIG. 1.

A tubular radial bearing 3 made of known oil-less metal is press fitted into the support boss 5e so that its central axial line coincides with a central axial line of a circle along which the steel balls 5a are arranged. FIG. 2 shows the geometrical relationship between the major surface (one-dot chain line) A of the thrust support surface of the thrust bearing 5 and the axial center line (double-dot chain line) B of the radial bearing 3. The axial center line B perpendicularly passes through the major surface A.

The thrust plate 5c which is disposed perpendicularly with respect to the support boss 5e is placed over the stator plate 1, and fixedly secured thereto by known means such as a bonding agent. A plurality of planar drive coils 7 are arranged on the stator plate 1 so as to concentrically surround the thrust ball bearing 5, and are connected to the electric circuit mentioned earlier. A motor stator assembly 15 is thus formed essentially by the stator plate 1, the radial bearing 3, the thrust ball bearing 5 and the drive coils 7.

The spindle motor further comprises a rotor plate 9 which is also stamp formed from ferromagnetic sheet metal such as steel plate and is provided with an axial flange projecting toward the stator plate 1 along the outer circumference thereof. An annular drive magnet 13 is attached to the inner surface thereof and a rotor shaft 11 is passed through a rotational center of the rotor plate 9 in a fixedly secured manner. An upper surface of the upper thrust plate 5d abuts a part of the lower surface of the rotor plate 9 concentrically surrounding the rotor shaft 11, and the lower end of the rotor shaft 11 is fitted into the radial bearing 3 so that the rotor plate 9 may freely rotate substantially without any play while the drive magnet 13 opposes the drive coils 7 defining an extremely small gap therebetween. A motor rotor assembly 17 is thus formed essentially by the rotor plate 9, the rotor shaft 11 and the drive magnet 13.

A brush-less spindle motor is thus formed by the stator assembly 15 and the rotor assembly 17, and the rotor plate 9 can be turned by energizing the drive coils 7 in a prescribed sequence. In this embodiment, the upper surface of the rotor plate 9 is adapted to mount a floppy disk thereon.

According to this arrangement, because the radial bearing 3 is directly supported by one of the thrust plates 5c of the thrust ball bearing 5, and this thrust plate 5c is flatly placed over the stator plate 1, the stator plate 1 is substantially less prone to deformation, and it becomes possible to reduce the possibility of tilting the rotor shaft 11 or the bearing device both during assembly and during use.

Also, because one of the thrust plates 5c forming the thrust ball bearing 5 is integrally provided with the support boss 5e extending toward the other thrust plate 5d in a perpendicular relationship, and the radial bearing 3 is fitted into this support boss 5e so as to integrally combine the radial bearing 3 and the thrust bearing 5, the radial bearing 3 supporting the rotor shaft 11 is very firmly secured with a highly simplified arrangement, and the possibility of tilting the rotor shaft 11 with respect to the thrust plate 5c or the thrust ball bearing 5 can be minimized.

Furthermore, because forming surface of the thrust plate 5c to be exactly perpendicular to the support boss 5e can be relatively easily accomplished, when the thrust plate 5c is fixedly secured to the stator plate 1 to form the spindle motor, a highly accurate plane of rotation can be achieved for the rotor plate 9, and it is possible to turn a floppy disk or the like in a highly precisely defined plane.

Figure 3:
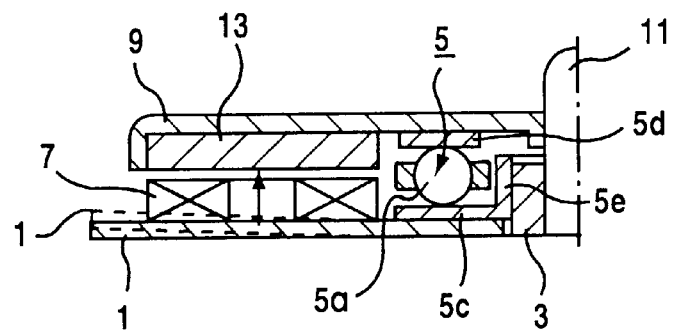
FIG. 3 is a diagram illustrating the mode of deformation of the stator plate according to the present invention.

By thus supporting the radial bearing 3 supporting the rotor shaft 11 with one of the thrust plates 5c of the thrust ball bearing 5, and directly securing the thrust plate 5c to the stator plate 1, even when the stator plate 1 is deformed as indicated by the broken line in FIG. 3 as a result of the magnetic attraction of the drive magnet 13, only the part of the stator plate 1 outside the radial bearing 3 undergoes deformation or tilting, and the radial bearing 3 is protected from such deformation. This factor also contributes to the prevention of the tilting of the rotor shaft 11 or the variations in the perpendicularity of the rotor shaft 11 with respect to the thrust receiving surface of the thrust ball bearing 5.

Figure 4:
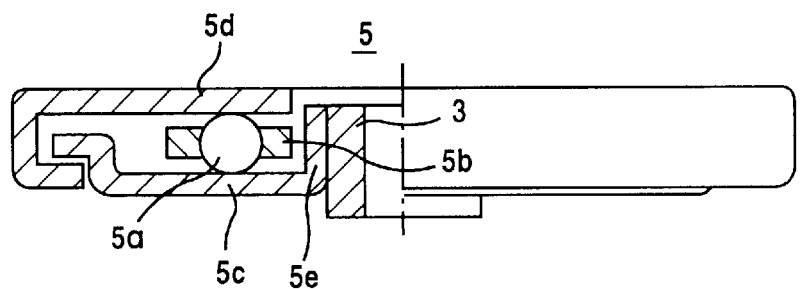
FIG. 4 is a sectional view showing a second embodiment of the bearing arrangement according to the present invention.

FIG. 4 shows a second embodiment of the present invention, and the parts corresponding to those of the previous embodiment are denoted with like numerals. In this embodiment, the outer periphery of the upper thrust plate 5d is bent downward and wrapped around the outer periphery of the lower thrust plate 5c. Obviously, there should not be any interference between the upper and lower thrust plates 5d and 5c so that the upper thrust plate 5d may freely rotate with respect to the lower thrust plate 5d. According to this arrangement, because the thrust ball bearing, optionally along with the thrust bearing 5, can be formed as an integral sub assembly, the assembly work may be improved in efficiency. Also, because the steel balls 5a are contained in a relatively enclosed space, they may be conveniently sealed so that they are protected from intrusion of foreign matters that could adversely affect the operation of the thrust ball bearing 5, and leakage of grease that may be applied to the steel balls out of the bearing assembly can be avoided.

Figure 5:
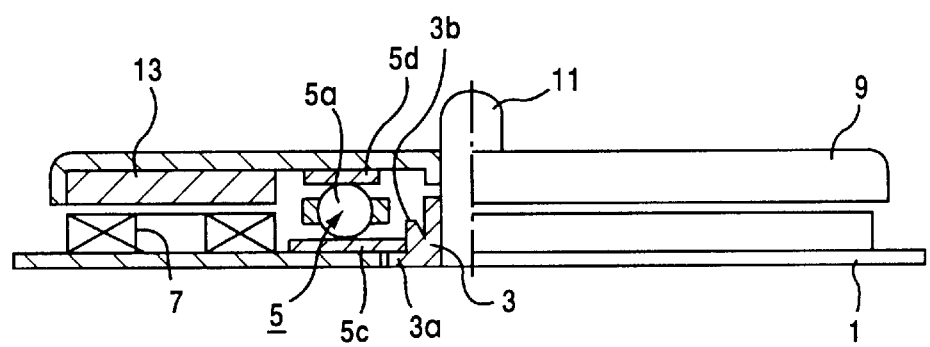
FIG. 5 is a sectional view showing a third embodiment of the bearing arrangement according to the present invention.
Figure 6:
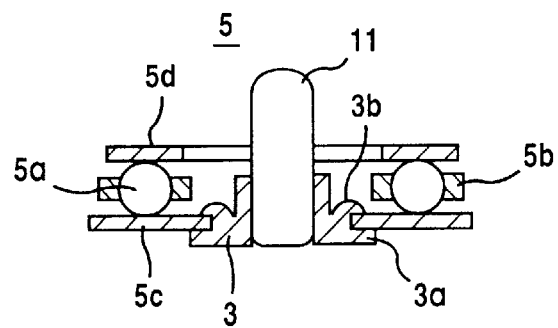
FIG. 6 is an enlarged view of the bearing arrangement of FIG. 5.
Figure 7:
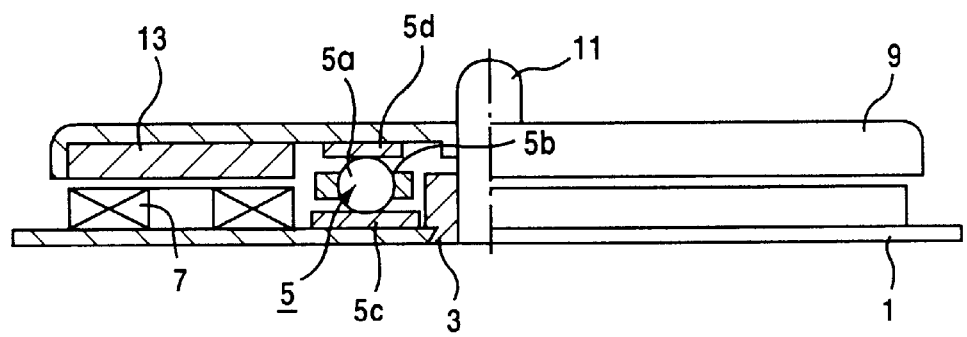
FIG. 7 is a view similar to FIG. 1 showing a conventional bearing arrangement.
Figure 8:
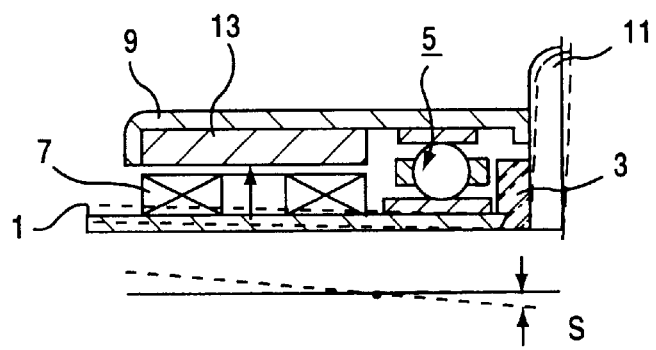
FIG. 8 is a diagram illustrating the mode of deformation of the stator plate according to the prior art.
Figure 9:
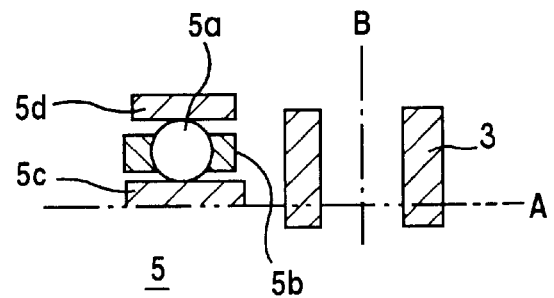
FIG. 9 is a diagram illustrating the geometrical relationship between the radial bearing and the thrust ball bearing.

FIGS. 5 and 6 show a third embodiment of the present invention along with an associated spindle motor. Again, the parts corresponding to those of the previous embodiments are denoted with like numerals. According to this embodiment, the radial bearing 3 is provided with a radial flange 3a, and a crimping portion 3b provided adjacent to the radial flange 3a. The radial bearing 3 can be attached to the lower thrust plate 5c by placing the inner periphery of the lower thrust plate 5c over the radial flange 3a, and crimping the crimping portion 3b onto the inner periphery of the lower thrust plate 5c from the other side. The lower thrust plate 5c is in turn securely attached to the stator plate 1 for instance by a bonding agent or other suitable means.

This embodiment can provide advantages similar to those of the first embodiment. In other words, because the thrust plate 5c is secured to the radial flange 3a extending perpendicularly to the central axial line of the radial bearing 3, the axial center of the rotor shaft 11 supported by the radial bearing 3 can be prevented from tilting with respect to the thrust plate 5c or the thrust ball bearing 5, and the whirling of the rotor shaft 11 can be avoided. Also, the manufacturing cost can be reduced.

Because the crimping portion 3b of the radial bearing 3 is integrally crimped onto the thrust plate 5c of the thrust ball bearing 5, the radial bearing 3 is also firmly secured, and the radial bearing 3 and the stator plate 1 can be made less prone to deformation. This also contributes to the prevention of the tilting of the rotor shaft 11.

By securing the thrust plate 5c of the thrust ball bearing 5 to the radial flange 3a of the radial bearing 3 which supports the rotor shaft 11, and fixedly securing the thrust plate 5c to the stator plate 1 serving as the base plate for the spindle motor, even when the stator plate 1 is deformed by the magnetic attraction of the drive magnets 13, similarly as the first embodiment, the stator plate 1 deforms only in the part surrounding the thrust plate 5c of the thrust ball bearing 5 so that the radial bearing 3 can be insulated from the deformation of the stator plate 1, and the tilting of the rotor shaft 11 can be effectively prevented.

In the above described embodiment, the radial bearing 3 was attached to the thrust plate 5c by crimping, but it is also possible to use press fitting, bonding, brazing, welding or other means of attachment. When welding is selected as means for securing the radial bearing to the thrust plate, it is preferable if the radial bearing is provided with a radial flange defining a shoulder surface for resting the inner peripheral part of the thrust plate thereon in a similar fashion as in the arrangement illustrated in FIG. 5. Then, the radial bearing can be securely attached to the lower thrust plate by laser welding, electric welding or brazing. The type of the thrust ball bearing 5 used in the above described embodiments can be changed to other known types of thrust bearings without departing from the spirit of the present invention. Also, the type of the electric motor can be changed to other types. For instance, the drive magnet 13 and the drive coils 7 may be disposed so as to oppose each other in the radial direction instead of the axial direction. The application of the present invention is not limited to floppy disk drives, but may also be applied to other applications where a spindle motor is required.

Although the present invention has been described in terms of preferred embodiments thereof, it is obvious to a person skilled in the art that various alterations and modifications are possible without departing from the scope of the present invention which is set forth in the appended claims.

I claim:

1. A bearing arrangement for an electric motor, comprising:

a thrust ball bearing interposed between a rotor member and a stator plate of an electric motor for supporting a thrust force acting between said rotor member and said stator plate;

a radial bearing fixedly secured to said stator plate for rotatably supporting a rotor shaft fixedly secured to said rotor member, said radial bearing having a radial flange and a crimping portion adjacent said radial flange, said radial bearing being attachable to a lower thrust plate by placing one of an inner periphery of said lower thrust plate over said radial flange and crimping said crimping portion onto said inner periphery of said lower thrust plate from an outer side of said inner periphery of said lower thrust plate, in turn, securely attached to said stator plate by a bonding agent, or other bonding means;

wherein said thrust bearing includes a first thrust plate which is fixedly secured to said stator plate, and said radial bearing is integrally attached to said stator plate via said first thrust plate.

2. An electric motor, comprising:

a stator assembly including a stator plate and drive coils mounted thereon;

a rotor assembly including a rotor member, a rotor shaft securely attached to said rotor member, and a drive magnet opposing said drive coils; and a radial bearing fixedly secured to said stator plate for rotatably supporting a rotor shaft fixedly secured to said rotary member, said radial bearing having a radial flange and a crimping portion adjacent said radial flange, said radial bearing being attachable to a lower thrust plate by placing one side of an inner periphery of said lower thrust plate over said radial flange and crimping said crimping portion onto said inner periphery of said lower thrust plate from an outer side of said inner periphery of said lower thrust plate, in turn, securely attached to said stator plate by a bonding agent, or other bonding means;

a thrust ball bearing which includes a first thrust plate fixedly secured to said stator plate, and said radial bearing integrally attached to said stator plate via said first thrust plate.

* * * * *